Feb. 20, 1973  F. J. LESKO  3,717,458
METHOD OF AND APPARATUS FOR FORMING A TUBULAR METAL
BLANK INTO A TAPERED TUBE ON A TAPERED MANDREL AND
STRIPPING THE TUBE FROM THE MANDREL
Filed Jan. 14, 1971  3 Sheets-Sheet 1
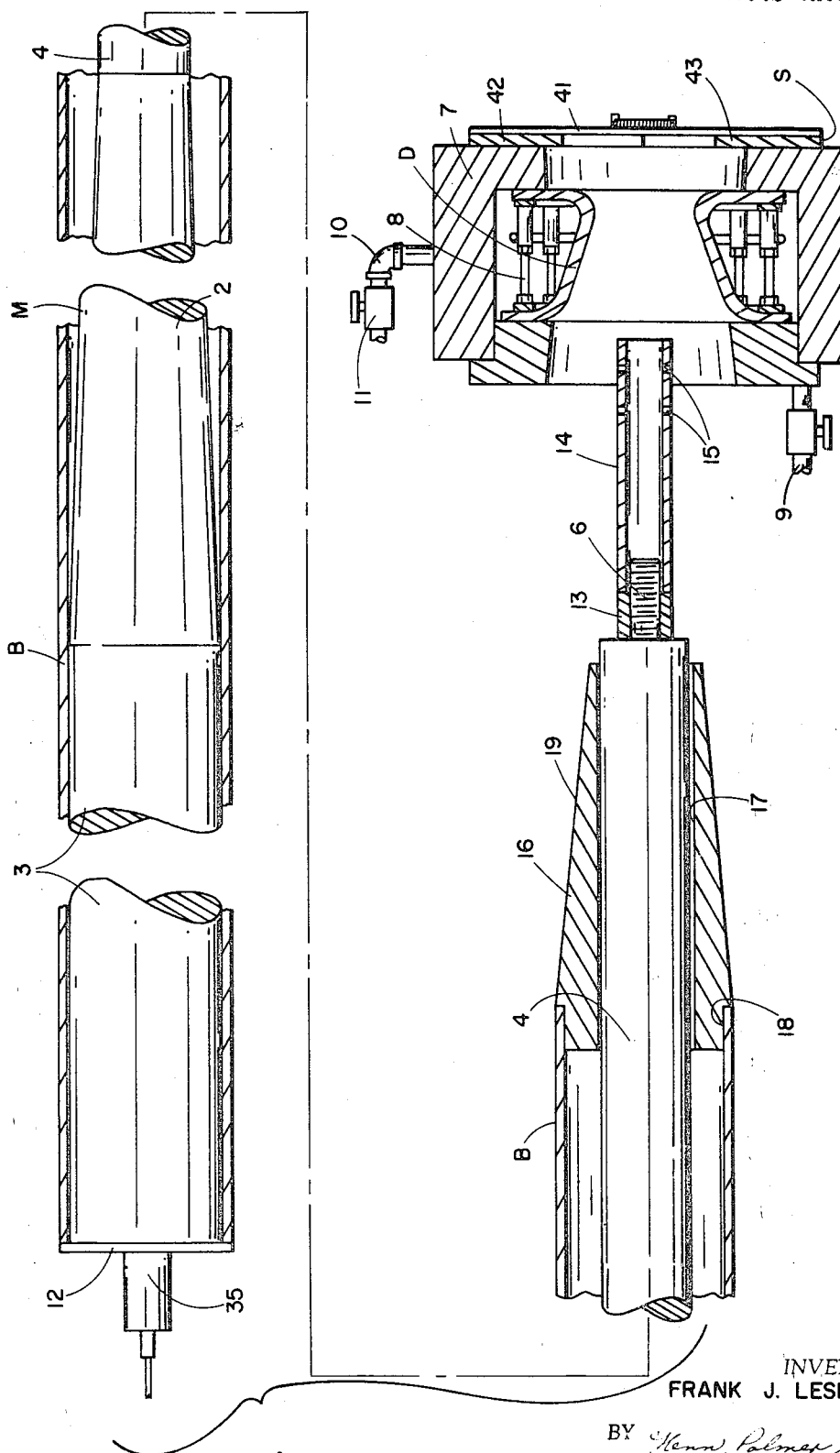
FIG.I.
INVENTOR
FRANK J. LESKO
BY Henn, Palmer, Lyne, Gibbs & Thompson
ATTORNEYS Feb. 20, 1973  F. J. LESKO  3,717,458
METHOD OF AND APPARATUS FOR FORMING A TUBULAR METAL
BLANK INTO A TAPERED TUBE ON A TAPERED MANDREL AND
STRIPPING THE TUBE FROM THE MANDREL
Filed Jan. 14, 1971  3 Sheets-Sheet 3

INVENTOR.
FRANK J. LESKO

United States Patent Office 3,717,458
Patented Feb. 20, 1973

3,717,458
METHOD OF AND APPARATUS FOR FORMING A TUBULAR METAL BLANK INTO A TAPERED TUBE ON A TAPERED MANDREL AND STRIPPING THE TUBE FROM THE MANDREL
Frank J. Lesko, Phoenix, Ariz., assignor to Reynolds Metals Company, Richmond, Va.
Filed Jan. 14, 1971, Ser. No. 106,366
Int. Cl. B21c 3/06
U.S. Cl. 72—276
2 Claims

ABSTRACT OF THE DISCLOSURE

A method of forming a tubular metal blank into a tapered tube on a tapered mandrel and stripping the tube from the mandrel comprising collapsing a tubular metal blank onto a tapered mandrel to closely embrace and assume the tapered shape of the mandrel and thereafter applying longitudinal force to the mandrel in the direction from the smaller toward the larger end of the mandrel and applying longitudinal force to the tapered tube in the opposite direction whereby to strip the tube from the mandrel. The longitudinal force is preferably applied to the end surface of the tapered tube, and desirably to substantially the entire end surface thereof, at the larger end. The tubular metal blank may be disposed about the tapered mandrel and the mandrel and blank may be moved through a die whereafter the tapered mandrel may be moved longitudinally in the direction from the smaller toward the larger end thereof while blocking movement of the tapered tube in that direction and thereby stripping the tube from the mandrel. Also apparatus for forming a tubular metal blank into a tapered tube on a tapered mandrel and stripping the tube from the mandrel comprising a tapered mandrel about which the tubular metal blank is adapted to be disposed, means for collapsing the tubular metal blank onto the tapered mandrel to closely embrace and assume the tapered shape of the mandrel, which means may comprise a die through which the tapered mandrel with the tubular metal blank thereabout passes, means for applying longitudinal force to the mandrel in the direction from the smaller toward the larger end of the mandrel and means for applying longitudinal force to the tapered tube in the opposite direction whereby to strip the tube from the mandrel. A stripper may be employed which is constructed and arranged to engage the end surface of the tapered tube at the larger end whereby to strip the tapered tube from the mandrel when the mandrel is moved in the direction from the smaller toward the larger end thereof. The stripper may be resiliently pressed against the outside of the tubular metal blank during collapsing of the tubular metal blank onto the tapered mandrel so that the stripper moves in behind the larger end of the tapered tube at the conclusion of the forming operation when the tapered mandrel with the tubular metal blank thereabout passes through the die with the smaller end of the tapered mandrel leading. The die may be mounted in a housing with the stripper mounted on the outside of the housing. The stripper is preferably in two opposed sections mounted on opposite sides of the mandrel and blank and preferably resiliently pressed to be movable toward each other into position to engage the end surface of the tapered tube at the larger end at the conclusion of the forming operation. The stripper sections are preferably shaped so that the stripper engages substantially the entire end surface of the tapered tube. The stripper sections may be mounted in guide means on the outside of the housing with spring means resiliently urging the stripper sections toward each other.

This invention relates to a method of and apparatus for forming a tubular metal blank into a tapered tube on a tapered mandrel and stripping the tube from the mandrel. In forming a tapered tube on a tapered mandrel a tubular metal blank is collapsed onto a tapered mandrel to closely embrace and assume the tapered shape of the mandrel. Normally the tubular metal blank is disposed about the tapered mandrel and the mandrel and blank are moved through a die. The material of which the die is formed does not constitute a limitation upon the present invention although I prefer to employ a die which is composed of a non-metallic plastic material such, for example, as hard and tough nylon, capable of being repeatedly deformed from its condition of repose during the forming operation and returned to its condition of repose. The die is mounted in a housing and means are provided for applying fluid pressure in the housing against the outside of the die to collapse the tubular metal blank about the tapered mandrel as the tubular metal blank and mandrel pass through the die. The blank to be formed into a tapered tube is normally of constant transverse dimension and may be of ferrous or non-ferrous metal but must be sufficiently ductile to respond to the forming operation; an example is aluminum.

In the formation of a tapered tube on a tapered mandrel the problem of stripping the tapered tube from the tapered mandrel is presented, which problem does not occur in the drawing of a tube of constant transverse dimension since such a tube may be formed over a short plug and at the end of the operation the trailing end of the tube passes beyond the plug so no stripping problem is encountered. However, when a tapered tube is formed on a tapered mandrel the tube is disposed about and is in tight frictional contact with the mandrel at the conclusion of the drawing operation. I provide for stripping the tapered tube from the mandrel by applying longitudinal force to the mandrel in the direction from the smaller end toward the larger end of the mandrel and applying longitudinal force to the tapered tube in the opposite direction, such forces being sufficient to overcome the frictional contact between the tapered tube and the tapered mandrel and withdraw the tapered mandrel from within the tapered tube. The longitudinal force applied to the tapered tube is preferably applied to the end surface thereof, and desirably to substantially the entire end surface thereof, at the larger end. The tubular metal blank may be disposed about the tapered mandrel and the mandrel and blank may be moved through the die whereafter the tapered mandrel may be moved longitudinally in the direction from the smaller toward the larger end thereof while blocking movement of the tapered tube in that direction and thereby stripping the tube from the mandrel.

I provide apparatus for forming a tubular metal blank into a tapered tube on a tapered mandrel and stripping the tube from the mandrel comprising a tapered mandrel about which the tubular metal blank is adapted to be disposed, means for collapsing the tubular metal blank onto the tapered mandrel to closely embrace and assume the tapered shape of the mandrel, which means may comprise a die through which the tapered mandrel with the tubular metal blank thereabout passes, means for applying longitudinal force to the mandrel in the direction from the smaller toward the larger end of the mandrel and means for applying longitudinal force to the tapered tube in the opposite direction whereby to strip the tube from the mandrel. A stripper may be employed which is constructed and arranged to engage the end surface of the tapered tube at the larger end whereby to strip tapered tube from the mandrel when the mandrel is moved in the direction from the smaller toward the larger end thereof. The stripper may be resiliently pressed against the outside of the tubular metal blank during collapsing of the tubular metal blank onto the tapered mandrel so that the stripper moves in behind the larger end of the tapered tube at the conclusion of the forming operation when the tapered mandrel with the tubular metal blank thereabout passes through the die with the smaller end of the tapered mandrel leading.

As above stated, the die is mounted in a housing; I prefer to mount the stripper on the outside of the housing. The stripper is preferably in two opposed sections mounted on opposite sides of the mandrel and blank and desirably resiliently pressed to be movable toward each other into position to engage the end surface of the tapered tube at the larger end at the conclusion of the forming operation. The stripper sections are preferably shaped so that the stripper engages substantially the entire end surface of the tapered tube. The stripper sections are desirably mounted in guide means on the outside of the housing with spring means resiliently urging the stripper sections toward each other.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which FIG. 1 is a diagrammatic cross-sectional view with portions cut away of a tapered mandrel with a tubular metal blank disposed thereabout ready to be advanced through a nylon die to form the tubular metal blank into a tapered tube on the tapered mandrel showing a bullet-shaped nose applied to the mandrel and blank and a stripper mounted on the die housing;

Figure 3:
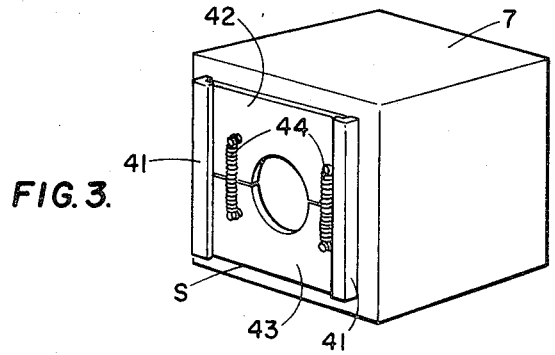
FIG. 3 is an isometric view showing the stripper mounted on the die housing.

Referring now more particularly to the drawings, there is shown a mandrel designated as a whole by the letter M. The mandrel has a central uniformly tapered portion 2. At the larger end of the uniformly tapered portion 2 the mandrel has an end portion 3 of uniform transverse dimension and at the smaller end of the uniformly tapered portion 2 the mandrel has an end portion 4 of uniform transverse dimension. The mandrel may be hollow or solid transversely and may be sectional or unitary longitudinally. For simplicity of illustration the mandrel is shown as a solid unitary steel mandrel with a threaded stud 5 at its larger end and a threaded stud 6 at its smaller end. The transverse or cross-sectional shape of the tapered portion 2 of the mandrel depends on the transverse shape of the tapered tube to be formed and the die presently to be described is correspondingly designed. For purposes of explanation and illustration the mandrel and die are shown as being of circular transverse shape.

The die is designated generally by the letter D. The form and design of the die and the material of which it is made constitute no part of the present invention so the die will not be described in detail. It is formed of hard and tough nylon and is capable of being repeatedly stretched outwardly and contracted back to its original form. In the form shown the die is of tapered U-shaped cross section mounted in a housing 7 and pressed against the sides of the housing by a spreader cage 8. Fluid under pressure is admitted through a pipe 9 to the housing in the annular space surrounding and formed by the die and is discharged through a pipe 10. The pressure exerted by the fluid on the die is controlled by any suitable means such as a manually or automatically operated relief valve 11. As the mandrel and blank are advanced through the die the blank is progressively collapsed by the die about the tapered portion 2 of the mandrel to form a tapered tube.

The tubular metal blank to be formed into a tapered tube on the mandrel is designated by the letter B. The inside diameter of the blank B is somewhat greater than the outside diameter of the larger cylindrical end portion 3 of the mandrel. For purposes of explanation and illustration the blank B may be deemed to be of aluminum or aluminum alloy. The tapered tube may be in a wide variety of sizes and used for the manufacture of such diverse products as baseball bats and lamp posts.

At the larger end of the mandrel is a flange 12. At the smaller end of the mandrel a nut 13 is threaded onto the stud 6; a sleeve 14 is welded to the nut 13. The sleeve 14 has bores 15 therethrough for a purpose to be presently described. The blank B is telescoped over the mandrel; the blank is introduced over the smaller end of the mandrel until it abuts the flange 12 as shown in FIG. 1. The opposite end of the blank terminates opposite the portion 4 of the mandrel as shown in FIG. 1, and the bullet-shaped nose 16 clearly shown in FIG. 1 is slipped over the end of the mandrel until it interfits with the end of the blank as shown. The bullet-shaped nose 16 has a bore 17 guidingly receiving the portion 4 of the mandrel and a kerf 18 receiving the end of the blank. The peripheral surface 19 of the bullet-shaped nose 16 is tapered from a size at the front end smaller than the opening in the die when the die is in repose (i.e., not under pressure) to a size at the base of the kerf 18 the same as the outside diameter of the blank as clearly shown in FIG. 1.

With the blank B and the bullet-shaped nose 16 thus assembled to the mandrel the mandrel is pushed to the right viewing FIG. 1 by means presently to be described. The bullet-shaped nose passes through and progressively expands the die while the die is still not under pressure until the leading end of the blank B has penetrated to the position shown in FIG. 2. The bullet-shaped nose 16 is removed and replaced by a fitting 20 having a bore 21 guidingly receiving the sleeve 14. A locking pin 22 is inserted through one of the bores 15 in the sleeve. The fitting 20 abuts the end of the portion 4 of the mandrel so the fitting is locked onto the mandrel by the pin 22. The fitting is sized to snugly fit into the end of the blank B and has its end tapered at 23 to facilitate entry into the blank. The mandrel is retracted to the left viewing FIG. 2 by means presently to be described. The blank is held against movement to the left with the mandrel by the die D. The fitting 20 enters the blank until the end of the blank engages the flange 24 of the fitting.

Figure 2:
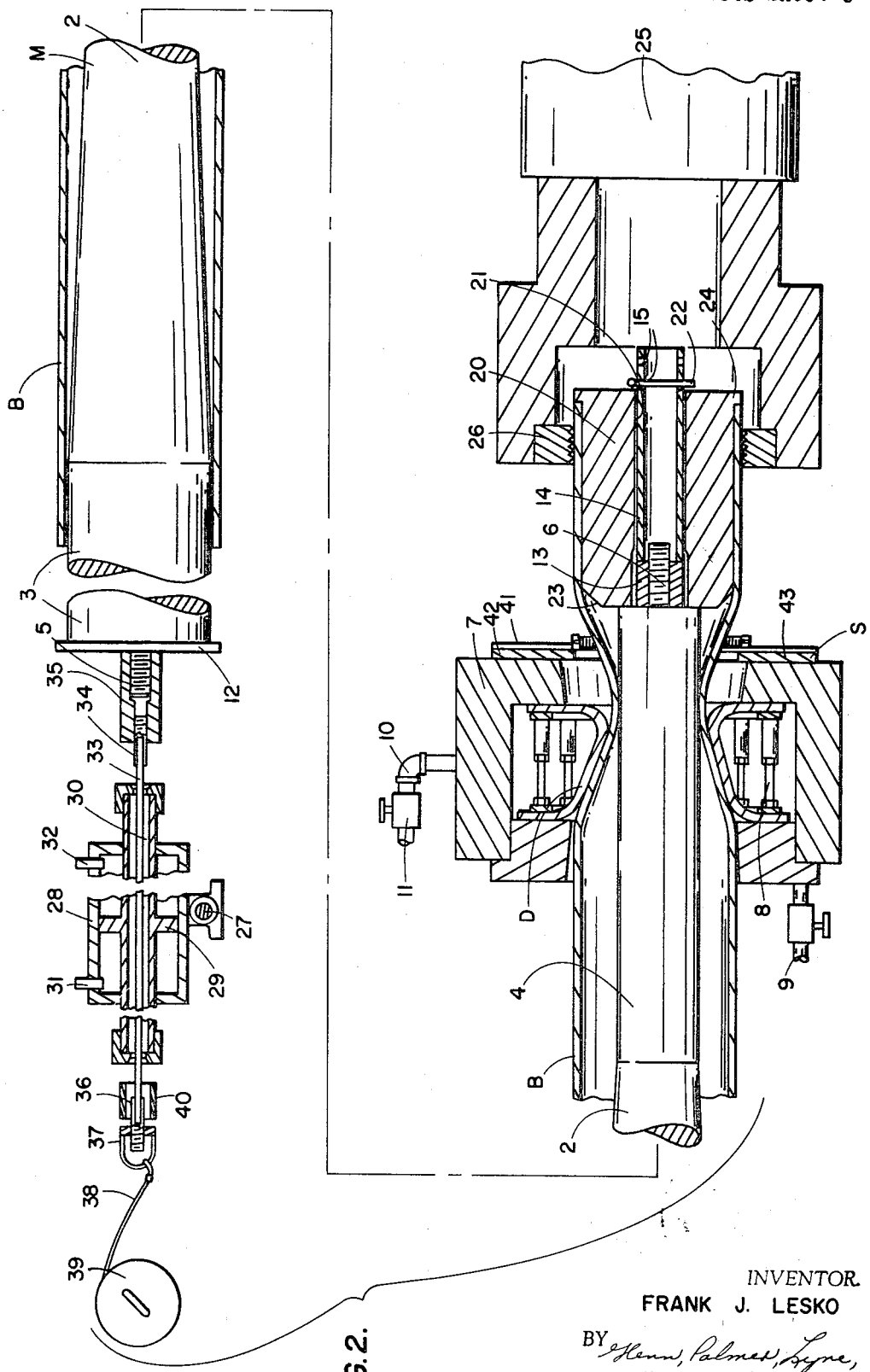
FIG. 2 is a view similar to FIG. 1 showing the mandrel and blank started through the die, showing the means for initially pushing the mandrel and blank through the die loosening the tapered tube from the mandrel and withdrawing the mandrel from the tapered tube and showing the means for pulling the mandrel and blank through the die after the mandrel and blank have been started through the die.

The apparatus includes the usual elongated bed (not shown) along which rides a carriage which may be of conventional construction and is equipped with means for clamping the work and pulling it through the die. The clamping means are designated generally by the numeral 25 and include clamping jaws 26. The carriage is moved in conventional manner to position for clamping the work and the clamping jaws 26 are operated to clamp the end of the blank B to the fitting 20 as shown in FIG. 2. Then the carriage carrying the clamping means is moved to the right along the bed, pulling the mandrel and blank through the die. Pressure is applied to the die which progressively collapses the blank onto the tapered mandrel as the mandrel and blank pass through the die forming a tapered tube.

Mounted on trunnions 27 is a cylinder 28 in which operates a piston 29. Portions of the piston extend out of both ends of the cylinder as shown in FIG. 2. The piston has a longitudinal passage 30 therethrough. Fluid under pressure may be admitted to and exhausted from the cylinder through either of two connections 31 and 32. The cylinder is in line with the mandrel M. An elongated member 33 which may be a length of cable extends through the longitudinal passage 30 in the piston and has a cable adapter 34 swaged thereto. The cable adapter 34 is threaded into a connector 35 which in turn is threaded onto the stud 5. The opposite end of the cable 33 has a cable adapter 36 swaged thereto which in turn is threaded into a connector 37 which is connected with a flexible cable 38 which is wound on a reel 39 which may be hand operated or power driven. A spacer 40 is interposed between the left hand end of the piston viewing FIG. 2 and the connector 37.

The cable 38 is connected with the mandrel M through the cable 33. The tubular metal blank B is introduced over the mandrel M from right to left viewing FIGS. 1 and 2. To facilitate such introduction of the blank over the mandrel the right hand end of the mandrel is tilted upwardly, which tilting is accompanied by turning of the cylinder 28 through a small angle about the axis of the trunnions 27. The mandrel with the blank thereon and the cylinder are then returned to horizontal position and fluid under pressure is admitted to the cylinder through the connection 31. The piston moves to the right viewing FIG. 2; the right hand end of the piston engages the connector 35 and continued movement of the piston to the right pushes the mandrel M and blank B with the bullet-shaped nose 16 through the die D as above explained. As the mandrel advances it draws the cable 38 with it. When the blank reaches the position of FIG. 2 the bullet-shaped nose is replaced by the fitting 20, the clamping jaws 26 are applied and the mandrel and blank are pulled through the die as above described. The stroke of the piston 29 need be only a fraction of the length of the mandrel since the piston pushes the mandrel only until the leading end of the blank passes through the die.

As the tapered tube is being formed by pulling of the mandrel and blank through the die the reel 39 continues paying out the cable 38. The length of the spacer 40 is such that just as the trailing end of the blank (now the tapered tube) passes through the die the connector 37 presses the spacer 40 against the left hand end of the piston, abruptly stopping the mandrel. The inertia due to the forward movement of the tapered tube loosens the tapered tube on the mandrel and facilitates withdrawal of the mandrel from the tapered tube.

Mounted on the right hand face of the housing 7 viewing FIGS. 1 and 2 are parallel L-shaped vertical guides 41 in which are slidably mounted upper and lower sections 42 and 43 respectively of a stripper designated as a whole by the letter S. The stripper sections are urged toward each other by tension coil springs 44. The lower edge of the stripper section 42 and the upper edge of the stripper section 43 have their opposed central portions cut out in semicircular form as shown in FIG. 3. The stripper sections are shown in fully closed or stripping position in FIG. 3 and in the diagrams FIGS. 4, 5 and 6.

The mandrel and tapered tube being formed pass through the circular opening in the stripper (FIG. 3). As the larger end of the tapered tube being formed approaches the stripper the stripper sections ride up on the outer surface of the tapered tube being formed and separate somewhat against the action of the springs 44 and when the trailing larger end of the formed tapered tube passes through the stripper the stripper sections snap together behind the tapered tube. The stripper sections are designed so that when they are together the diameter of the circular opening formed between them is equal to the inside diameter of the larger end of the tapered tube; thus the end of the tube bears against the stripper through substantially the full area of the end surface of the tube.

Figure 4:
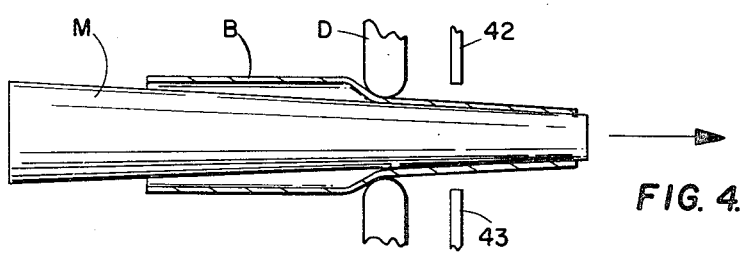
FIGS. 4, 5 and 6 are diagrams illustrating the operation of the stripper.
Figure 5:
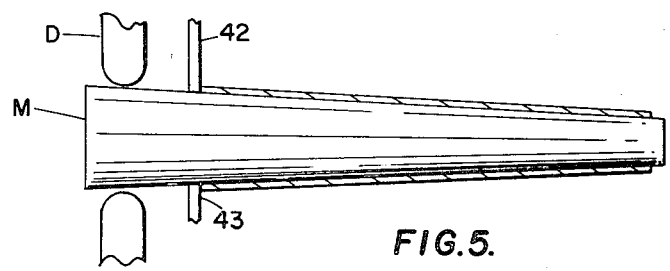
Figure 6:
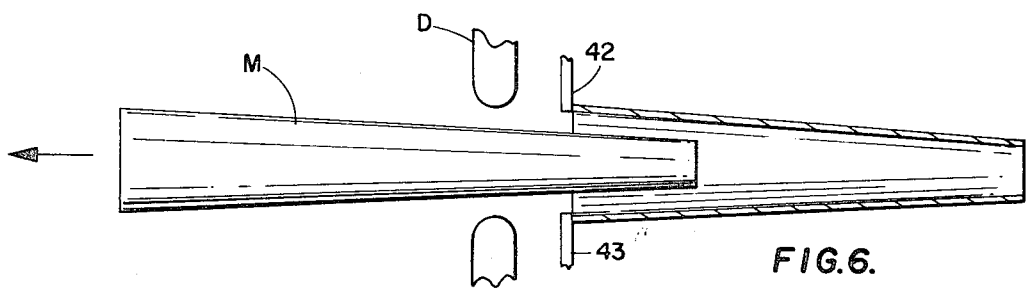

FIG. 4 shows the tapered tube in process of formation with the mandrel and the formed portion of the tube passing through the stripper. FIG. 5 shows the stripper just having snapped into place behind the trailing larger end of the formed tapered tube. FIG. 6 shows the stripper holding the formed tapered tube against movement to the left as the mandrel is withdrawn, thus stripping the tube from the mandrel.

The mandrel is withdrawn by winding up the cable 38 on the reel 39. The piston 29 is moved to the left in the cylinder 28 by admitting fluid under pressure through the connection 32 and exhausting fluid through the connection 31. Thus upon withdrawal of the mandrel to the position of FIG. 1 the apparatus is ready for the next cycle of operation.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. Apparatus for forming a tubular metal blank into a tapered tube on a tapered mandrel and stripping the tube from the mandrel comprising a tapered mandrel about which the tubular metal blank is adapted to be disposed, means for collapsing the tubular metal blank onto the tapered mandrel to closely embrace and assume the tapered shape of the mandrel, means separate from the first mentioned means for applying longitudinal force to the mandrel in the direction from the smaller toward the larger end of the mandrel and means for applying longitudinal force to the tapered tube in the opposite direction whereby to strip the tube from the mandrel.

2. Apparatus for forming a tubular metal blank into a tapered tube on a tapered mandrel and stripping the tube from the mandrel as claimed in claim 1 in which the second mentioned means are completely functionless during the collapsing of the tubular metal blank onto the tapered mandrel.

References Cited

UNITED STATES PATENTS

| 3,570,297 | 3/1971 | Matthews | 72—276 |
| 441,927 | 12/1890 | Bray | 72—283 |
| 3,470,725 | 10/1969 | Brown et al. | 72—336 |
| 3,327,513 | 6/1967 | Hinshaw | 72—367 |

CHARLES W. LANHAM, Primary Examiner

M. J. KEENAN, Assistant Examiner

U.S. Cl. X.R.

72—283